United States Patent [19]

Ledbetter

[11] Patent Number: 5,094,266

[45] Date of Patent: Mar. 10, 1992

[54] PRESSURE RELEASE VALVE

[76] Inventor: Harold J. Ledbetter, 8929 E. 106th St. North, Owasso, Okla. 74055

[21] Appl. No.: 704,219

[22] Filed: May 22, 1991

[51] Int. Cl.[5] .............................................. F16K 17/08
[52] U.S. Cl. .................................... 137/469; 251/332
[58] Field of Search ............... 137/469, 475, 476, 477, 137/478; 251/332

[56] References Cited

U.S. PATENT DOCUMENTS

| | | | |
|---|---|---|---|
| 2,110,481 | 3/1938 | Crocker | 137/469 |
| 2,813,539 | 11/1957 | Farris | 137/469 |
| 3,897,802 | 8/1975 | Bass | 137/478 |

*Primary Examiner*—Stephen M. Hepperle
*Attorney, Agent, or Firm*—Head & Johnson

[57] ABSTRACT

A pressure release valve which includes a body having a cavity in the form of a frustum extending from a circular base and terminating in a circular opening at the top of the frustum. An annular lip extends perpendicularly from the circular opening toward the base of the body, the lip having a recessed annular shoulder. A central shaft extends axially through the circular opening in the body. A spindle head disc extends radially from the central shaft and has a circular edge seatable in the recessed annular shoulder. A top disc extends radially from the shaft, the top disc terminating in a downwardly extending flange spaced from the spindle head disc circular edge and spaced from the annular lip. Seals between the spindle head disc and the top disc provide a seal with the annular lip when the valve is in the closed position.

5 Claims, 6 Drawing Sheets

PRESSURE RELEASE VALVE

BACKGROUND OF THE INVENTION

1. Field of the Invention

The present invention relates to a self-actuated pressure release valve for use with pressurized fluids or gasses. In particular, the present invention relates to a pressure release valve which may be utilized in handling and storing pressurized fluids or gasses in containers.

2. Prior Art

Self-actuated pressure release valves, being automatic pressure-relieving devices, are not only useful but required in handling and storing of pressurized gasses and liquids. These valves are known in the energy, industrial and aerospace industries.

A pressure release valve should have a number of attributes. The valve should have the ability to maintain an adequate seal while under pressure. Normally the valve will be held in the closed position by a spring The seals or gaskets themselves should be easily replaceable while the valve is in place. Additionally, the valve should be fast opening and self-actuated at a precise set pressure. Finally, when the pressure opens the valve at the set or "pop" pressure, the valve should remain fully open for discharge at the proper flow rate to assure adequate discharge in the event of excessive pressure. An adequate flow rate will prevent a pressure increase during discharge or accumulation. The flow rate is enhanced by a laminar flow through the valve, rather than a turbulent flow.

Indeed, all pressurized tanks or containers are subject to a number of regulations. For instance, all vessels operating in excess of 15 psig must be designed and constructed in accordance with the American Society of Mechanical Engineers (ASME) code, Section VIII, for Unfired Pressure Vessels.

Prior pressure release valves have attempted to address these issues in various ways.

Portis (U.S. Pat. No. 3,035,604) discloses a spring loaded valve having a sloping tapered valve that mates with a sloping valve seat. An overhanging, downwardly extending flange mates with an O-ring and valve seat.

Folmsbee (U.S. Pat. No. 2,599,622) discloses a safety valve wherein the gasket can be replaced while in service. A valve head disc has a downwardly turned lip which forms an opening to receive an O-ring.

Klinkenberg (U.S. Pat. No. 2,834,374) illustrates a pressure relief valve, variations of which are commercially available. An upwardly facing shoulder of the body seals with a circular, flat disk held by a valve member.

Farris (U.S. Pat. No. 2,517,858) recognizes the importance of maintaining an adequate lift or thrust so that the proper flow rate will be maintained once the valve has opened.

It is a principal object and purpose of the present invention to provide a pressure relief valve which will maintain an adequate seal while under pressure and which may be depressurized for replacement of the seals or gaskets while the valve is in place.

It is a further object and purpose of the present invention to provide a valve that will open at a precise pressure over the load pressure and will remain open for discharge at a proper flow rate.

It is an additional object and purpose of the present invention to provide a pressure relief valve that is designed to encourage laminar flow and discourage turbulent flow therethrough.

SUMMARY OF THE INVENTION

The pressure release valve of the present invention is employed as a safety measure in the handling and the storage of gasses or liquids under pressure.

The valve has a substantially cylindrical body, the exterior of which is threaded so that it may be received in a container or tank. A cavity in the body is in the form of a tapered cylinder or an inverted frustum. The base of the frustum is level with the top of the body and the frustum extends therefrom. The cavity terminates in a circular opening at the top of the frustum so that flow is permitted through the body.

A central shaft extends axially through the circular opening and has a threaded end. A helical compression spring surrounds the shaft outside of the cavity and imparts a force axially to the shaft. The force of the spring retains the valve in the normally closed position.

A guide surrounds the shaft and engages one end of the spring. The other end of the spring may be retained by a washer and nut secured to the shaft.

The guide is engaged with a guide support which receives the central shaft therethrough. The guide support has two elongated openings that allow the gas or liquid to flow to the circular opening. The body has an annular shoulder which receives the guide support.

A spindle head disc extends radially from the central shaft and has a bottom surface which is substantially perpendicular to the shaft. The spindle head disc extends outwardly to a circular edge. The top of the spindle head disc is graduated to form a series of indentations.

A top disc extends radially from the central shaft and has a threaded central opening to allow removable connection to the shaft. The top disc mates with the top of the spindle head disc to form a pair of annular openings. The top disc terminates in a downwardly extending flange which is substantially parallel to the shaft.

The body has an annular lip extending near the circular opening in the cavity toward the top of the body. The annular lip extends toward and perpendicular to the base of the frustum. The lip has a recessed annular shoulder. The circular edge of the spindle head disc seats in the annular shoulder when the valve is in the closed position. The function of the spindle head disc and the annular shoulder provides a partial, but not complete seal. The seal is created by a pair of O-rings that are retained in the annular openings formed by the spindle head disc and top disc. When in the closed position, one of the O-rings is compressed and seats against the annular lip extending from the body. Accordingly, a tight seal is created.

When the valve is not under pressure, the O-rings may be replaced by unscrewing the top disc from the shaft.

The downwardly extending flange of the top disc is spaced from the circular edge of the spindle head disc and is also spaced from the annular lip extending from the body. The spacing of the flange assists in providing a thrust or lift when the valve reaches its set or pop pressure.

DETAILED DESCRIPTION OF THE PREFERRED EMBODIMENTS

Figure 1:
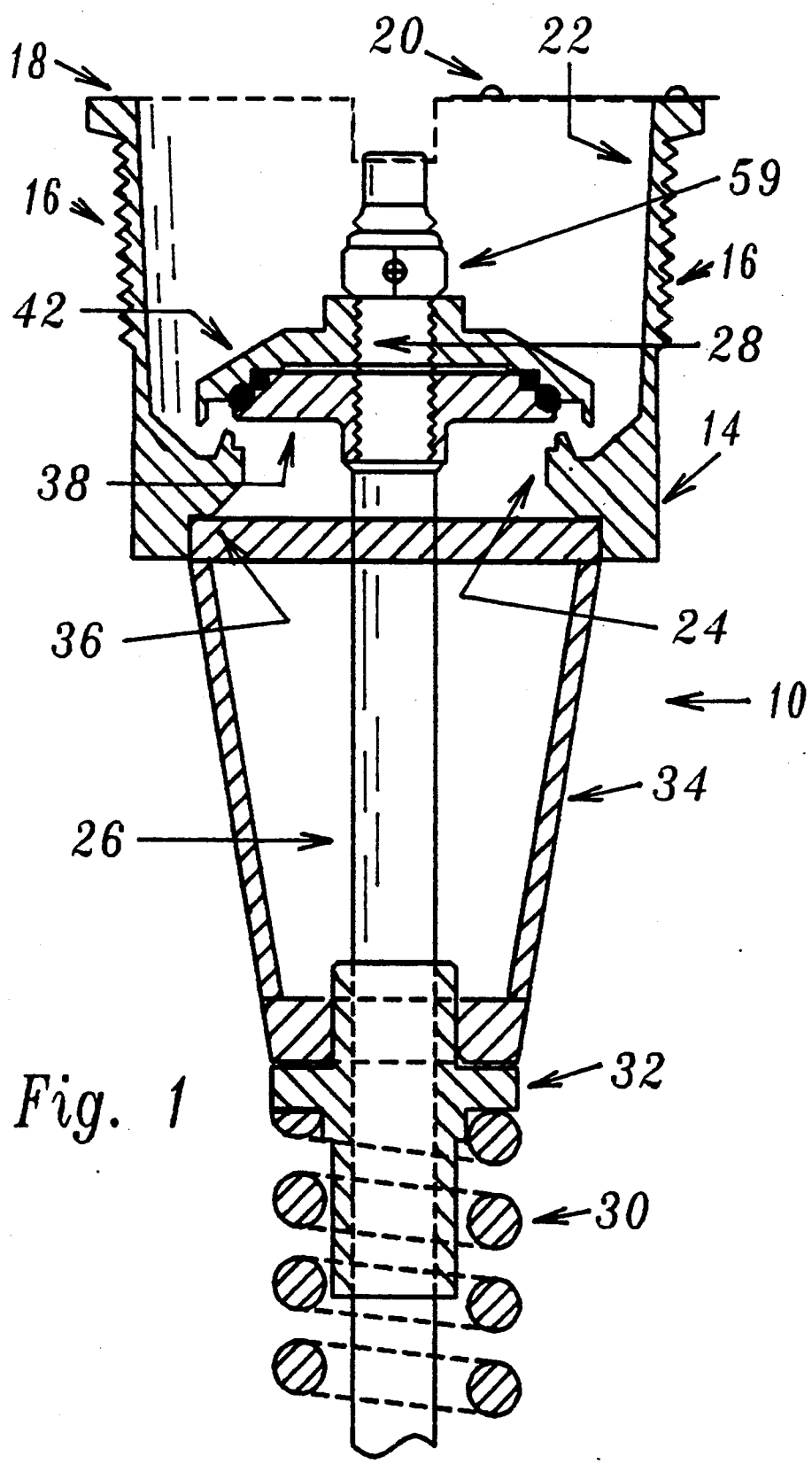
FIG. 1 is a sectional view of a pressure release valve constructed in accordance with the present invention.

Referring to the drawings in detail, FIG. 1 is a cross-sectional view of a pressure relief valve 10 which is employed as a safety measure in the handling and storage of gasses or liquids under pressure.

The valve would be used in a variety of applications and is frequently used in containers or tanks (not shown) having a cylindrical recess. Indeed, in the present embodiment discussed herein, the valve is designed to be received in a cylindrical opening having a standard three inch thread diameter.

The operational members of the valve are recessed within the cylindrical opening. This arrangement is known as flush mounted. This is advantageous since if the valve were above the exterior level of the container, it would be subject to damage. For instance, if the tank or container were to roll over, the flush-mounted valve will not be subject to damage.

The valve 10 has a body 14 which is substantially cylindrical. The exterior of the body is threaded at 16 so that it may be received in a container or tank (not shown). The top 18 of the body 14 would be flush with the container or tank. A nameplate 20 might be secured to the top of the body with data on the particular valve printed thereon. This information would include the maximum allowable working pressure of the tank or container coincident with the maximum allowable operating temperature.

A cavity 22 in the body 14 is in the form of a tapered cylinder or an inverted frustum. The base of the frustum is level with the top 18 of the body and the frustum extends therefrom. In the present embodiment, the cavity wall extends from the base with approximately a three degree incline. Thereafter, the wall has a portion that extends at approximately a 45 degree incline. The cavity 22 terminates in a circular opening 24 at the top of the frustum. Accordingly, the body itself permits flow therethrough.

A central shaft 26 extends axially through the circular opening 24 and has a threaded end 28. A helical compression spring 30 surrounds the shaft 26 outside of the cavity 22 in the body 14 and imparts a force axially to the shaft. The spring 30 retains the valve normally in the closed position. A spring must be used that holds the valve closed until the set pressure is reached, and then allows the valve to fully open to give the required flow.

A spacer tube (not shown) may be inserted around the shaft and internal to the spring 30 to prevent the spring 30 from distorting while under pressure. A single long spring or a number of springs in series having the same length as the single spring may be utilized.

A guide 32 surrounds the shaft and engages one end of the spring 26. The other end of the spring may be retained by a washer and nut (not shown) secured to the shaft.

The guide 32 is engaged with a guide support 34 that receives the central shaft therethrough. The guide support has two elongated openings that allow the gas or liquid to flow to the circular opening 24. In the present embodiment, the elongated openings have an area 3.15 times the area of the circular opening in order to ensure maximum discharge. The body 14 has an annular shoulder which receives the guide support 34.

Figure 2:
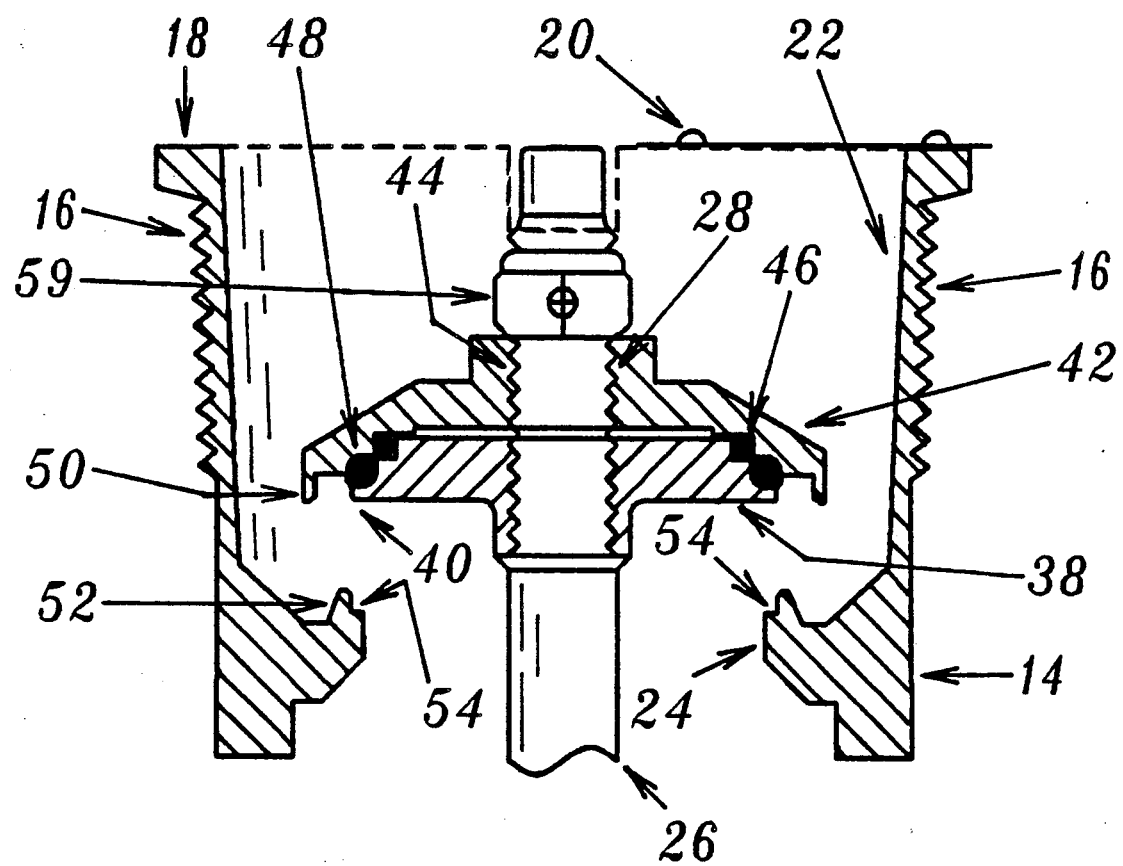
FIG. 2 is an enlarged sectional view of the pressure release valve shown in FIG. 1 with several components removed for clarity.
Figure 3:
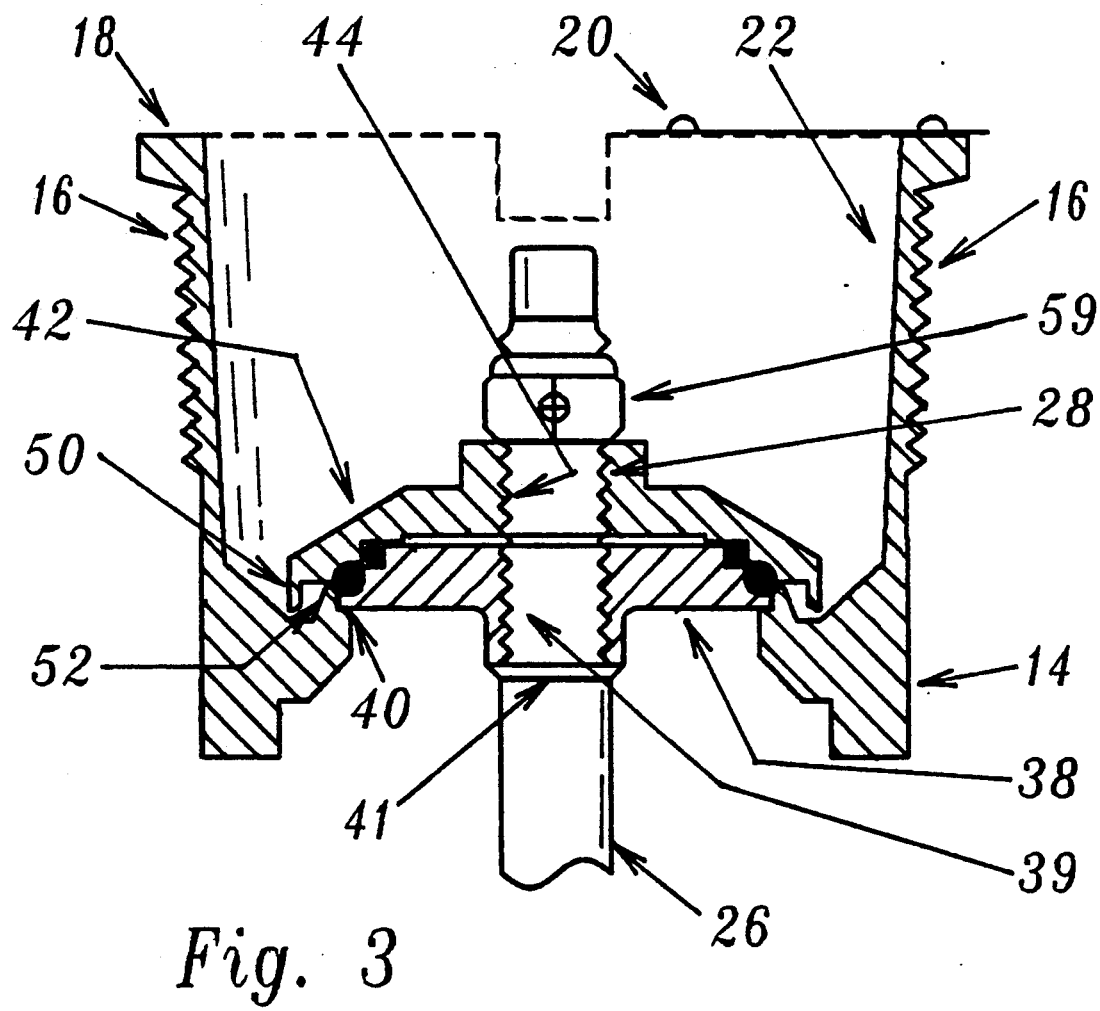
FIG. 3 is a sectional view as seen in FIG. 2 with the valve closed.

FIG. 2 shows an enlarged sectional view of the valve with body 14 apart from the guide support 34, guide 32 and spring 30. FIG. 3 illustrates a partial, enlarged sectional view of the valve in the closed position.

A spindle head disc 38 extends radially from the central shaft 26. The spindle head disc has a central threaded opening 39. In the present embodiment, the spindle head disc is welded to the central shaft at 41 to assure a good seal with the shaft. The spindle head disc 38 has a bottom surface which is substantially perpendicular to the shaft. The spindle head disc extends outwardly to a circular edge 40. The top of the spindle head disc is graduated to form a series of indentations.

A top disc 42 extends radially from the central shaft 26. The top disc 42 has a threaded central opening 44 to allow removable connection to the shaft. The top disc mates with the top of the spindle head disc to form a pair of annular openings 46 and 48. The top disc terminates in a downwardly extending flange 50. The flange 50 is substantially parallel to the shaft 26.

The body 14 has an annular lip 52 extending near the circular opening into the cavity toward the top 18 of the body 14. In other words, the annular lip 52 extends toward the base of the frustum perpendicular to the base of the frustum.

Returning to a consideration of FIG. 1, the spring 30 provides a constant force on the shaft drawing the spindle head disc 38 and the top disc 42 toward the circular opening and the lip 52. The spring loading is adjusted so that a predetermined pressure will lift the spindle head disc.

Figure 4:
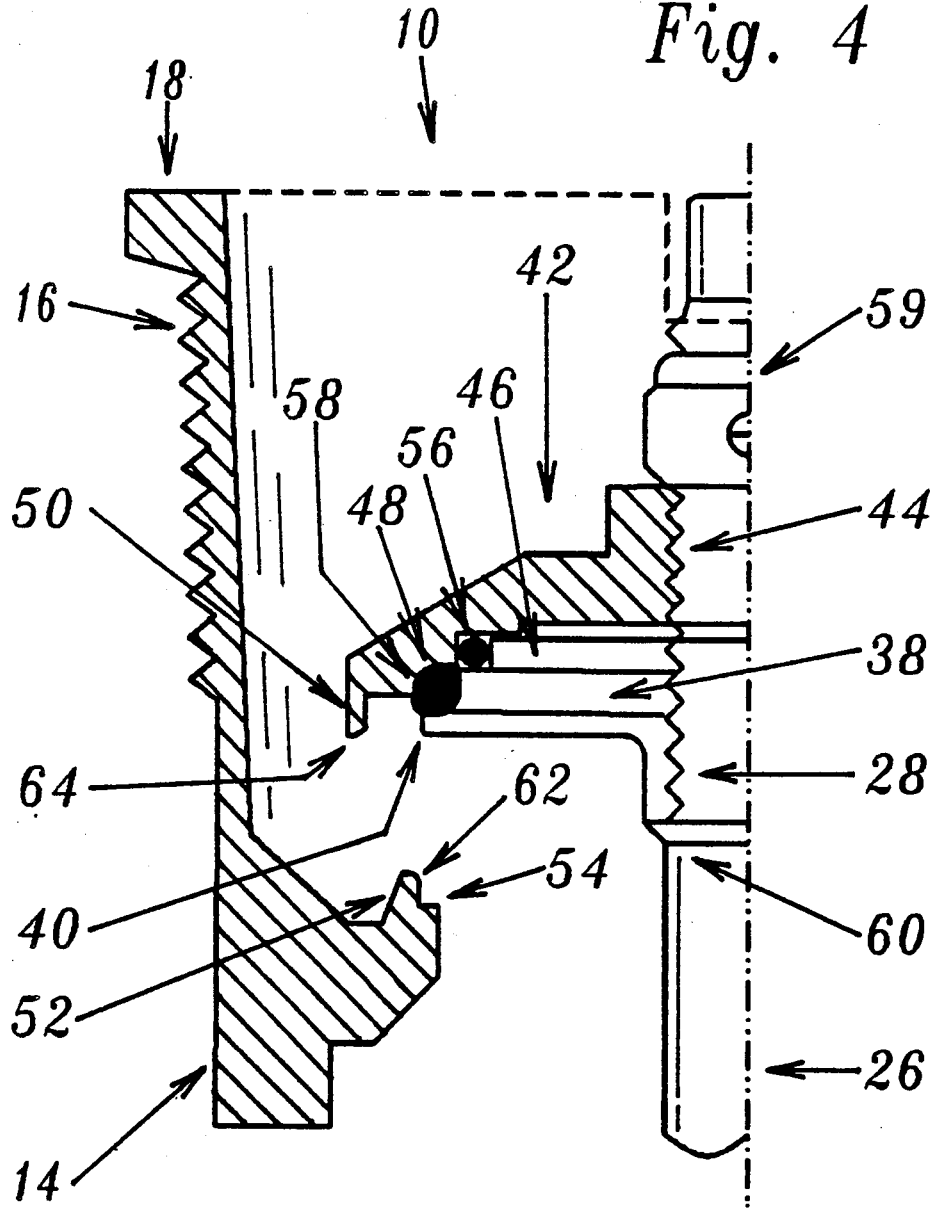
FIG. 4 is a partial sectional view of the pressure release valve in the open position.
Figure 5:
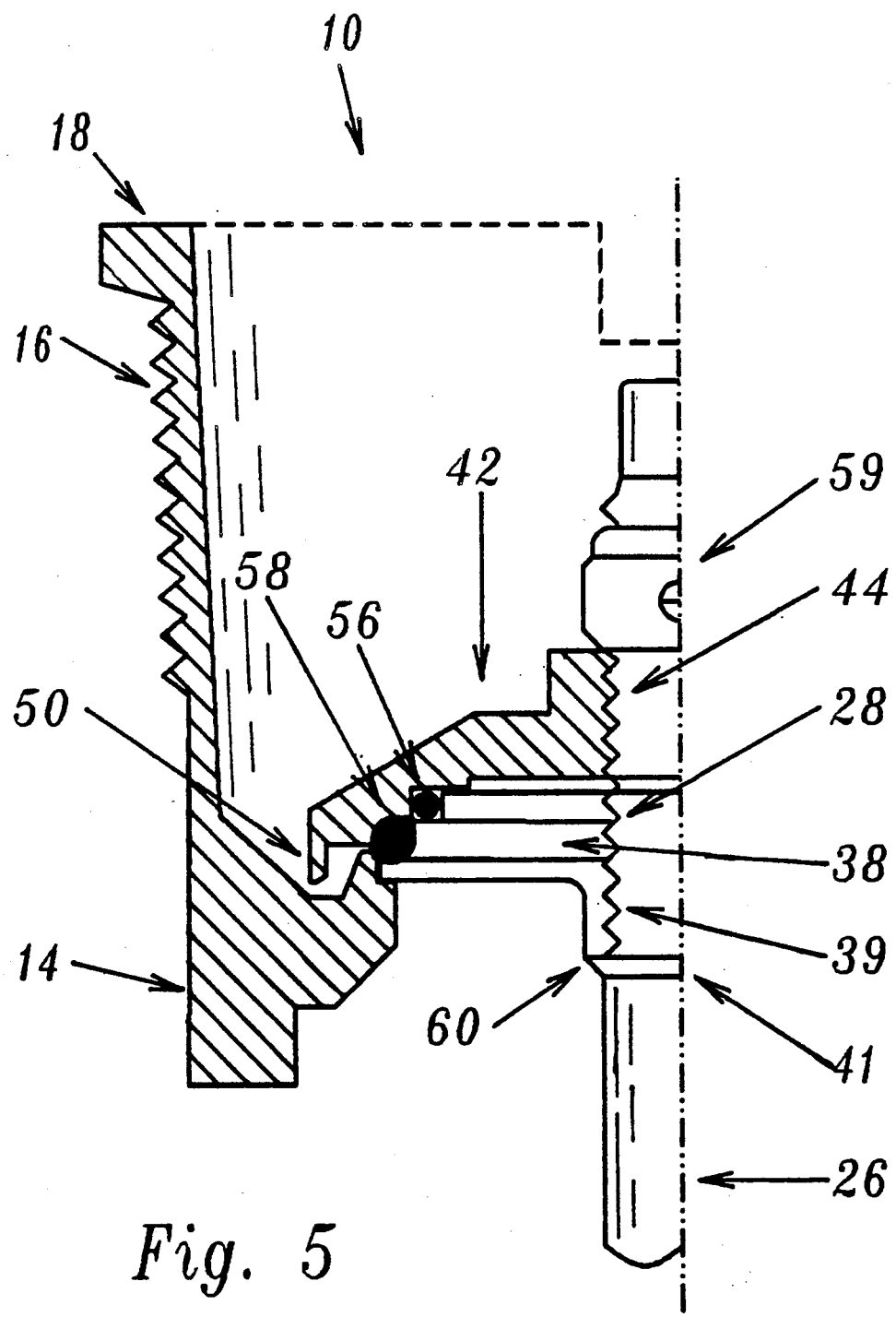
FIG. 5 is a partial sectional view of the pressure release valve in the closed position.
Figure 6:
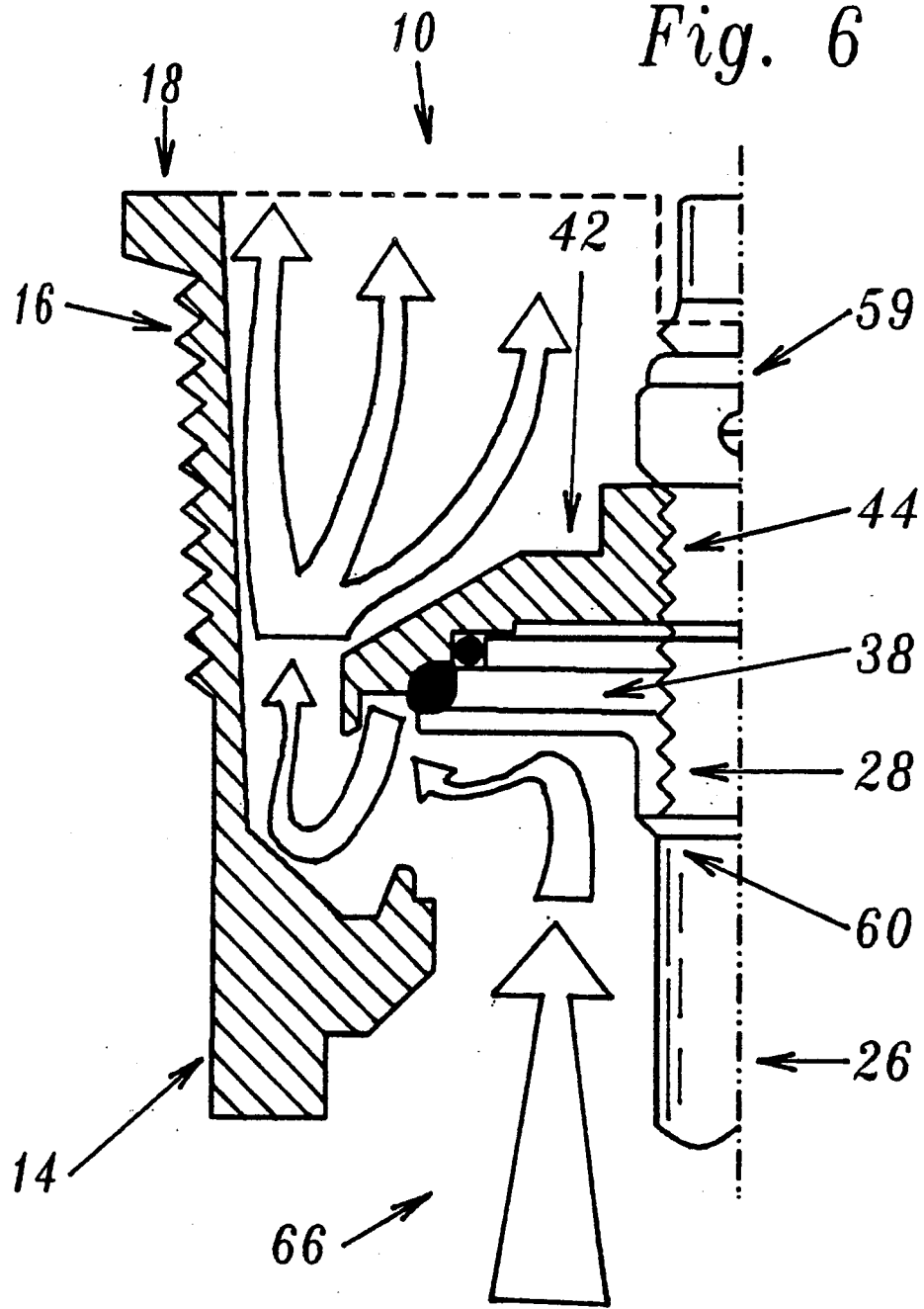
FIG. 6 is the partial sectional view of the pressure release valve seen in FIG. 4 with arrows indicating outward flow.

As best seen in the partial sectional views of FIG. 4 in the valve open position and FIG. 5 in the valve closed position, the lip 52 has a recessed annular shoulder 54. The circular edge 40 of 10 the spindle head disc 38 seats in the annular shoulder 54 when the valve is in the closed position. The junction of the spindle head disc and the annular shoulder provides a partial, but not complete, seal.

A seal is created by a pair of O-rings 56 and 58 that are retained in the annular openings 46 and 48. The O-rings are compressed by tightening the top disc against the spindle head. When in the valve closed position, O-ring 58 compresses against the annular lip 52 to create a tight seal. O-ring 56 acts as a secondary seal.

When the valve is not under pressure, the O-rings 56 and 58 may be replaced. This is a desirable feature in the event of wear on the O-rings and in the event O-rings of different compositions are required for different chemicals.

In order to replace the O-rings, a stop nut 59 is removed from the shaft 26. Once the stop nut 59 is removed, the top disc 42 may be unscrewed from the shaft 26. After removal of the top disc 42, the O-rings are exposed and may be replaced.

It will be observed that the downwardly extending flange 50 of the top disc 42 is spaced from the circular edge 40 of the spindle head disc 38 and spaced from the annular lip 52 extending from the body 14. Spacing of the flange 50 from the annular lip 52 where the seal is maintained is important once the set or pop pressure has been reached. With reference to FIGS. 4 and 5, it will be observed that when the valve has reached the set pressure, the shaft will move axially and be raised. The escaping gas or liquid will move over the annular lip 52 and toward the flange 50.

The downwardly extending flange 50 directs the discharging gas or liquid downward toward the body 14 which creates lift or thrust to retain the valve in the open position.

When the tank or container is at its operating pressure, the force of the gas or liquid is directed solely to the bottom surface of the spindle head disc 38. When the pressure exceeds the set pressure, the force of the spring is overcome and the spindle head disc and top disc begin to rise. The discharging gas will then act against the outer portion of the top disc and the downwardly extending flange as well as the spindle head disc. The discharging gas or liquid acts against a surface of increased area whereby a greater total force is developed against the spring load. This causes maximum capacity or flow-through in the shortest interval and helps retain the valve 10 open at full capacity.

While a larger radius to the top disc might also increase the force against the spring, it will be recalled that the entire valve must be contained within the standard three inch diameter recess.

The entire valve 10 is designed to encourage laminar flow, and to discourage turbulent flow. Where the central shaft 26 meets the spindle head disc 38, a sloping portion 60 directs flow toward the circular edge 40. As best seen in the valve open position in FIG. 4, the annular lip 52 is rounded with a radial edge 62 to encourage a more laminar flow. The radial edge 62 of the annular lip 52 mates with the O-ring 58 to create a seal, as previously described.

Additionally, the downwardly extending flange 50 is beveled at its end 64 with a 45 degree angle. This beveled edge 64 encourages flow toward the 45 degree portion of the cavity 22. The direction of flow of the discharging gas or liquid is illustrated by arrows 66.

The attributes of the present invention may be observed from an example of a test which the valve has been subjected to. The test, pursuant to the ASME code, Section VIII, not only measures whether the valve will open at its set pressure but whether an adequate flow rate is maintained once the valve has opened. A two inch valve 10 having a rated set pressure of 100 psig was initially pressurized to its set or pop pressure so that the valve would open. The valve opened at a set pressure of 99.3 psig. Additional pressure was then supplied so that accumulation would occur. The vessel was pressurized up to 119.2 psig and the pressure was maintained at 20% over the set pressure. The discharge through the opening was then measured in cubic feet per minute. The valve capacity in cubic feet per minute was calculated at 1766 cfm. In each instance, the valve 10 achieved higher than the minimum required flow rate and considerably higher than the flow rate of other competing pressure release valves.

Whereas, the present invention has been described in relation to the drawings attached hereto, it should be understood that other and further modifications, apart from those shown or suggested herein, may be made within the spirit and scope of this invention.

What is claimed is:

1. A pressure release valve which comprises:
   a. a body having a cavity in the form of a frustum extending from a circular base and terminating in a circular opening at the top of said frustum;
   b. an annular lip extending from said circular opening into said cavity perpendicularly toward said base of said body, said lip having a recessed annular shoulder;
   c. a central shaft extending axially through said circular opening in said body;
   d. a spindle head disc extending radially from said central shaft and having a circular edge seatable in said recessed annular shoulder;
   e. a top disc extending radially from said shaft, said top disc terminating in a downwardly extending flange spaced from said spindle head disc circular edge and spaced from said annular lip wherein said top disc mates with said spindle head disc to form a pair of annular openings therebetween; and
   f. seal means including a pair of O-rings retained in said annular openings compressed between said spindle head disc and said top disc providing a seal with said annular lip.

2. A pressure release valve as set forth in claim 1 including spring means imparting a force axially to said central shaft in order to draw said spindle head disc circular edge toward said annular shoulder.

3. A pressure release valve as set forth in claim 1 wherein said body has external threads and may be threadably received in a cylindrical opening in a container.

4. A pressure release valve as set forth in claim 1 wherein said top disc is removably connected to said central shaft so that said top disc may be removed and access may be obtained to said seal means.

5. A pressure release valve as set forth in claim 1 wherein said cavity in said body extends initially from said circular base at a 3 degree angle and then extends at a 45 degree angle.

* * * * *